United States Patent
Park et al.

(10) Patent No.: US 11,735,167 B2
(45) Date of Patent: Aug. 22, 2023

(54) ELECTRONIC DEVICE AND METHOD FOR CONTROLLING THE SAME, AND STORAGE MEDIUM

(71) Applicant: Samsung Electronics Co., Ltd., Suwon-si (KR)

(72) Inventors: Jihun Park, Suwon-si (KR); Dongheon Seok, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 17/103,379

(22) Filed: Nov. 24, 2020

(65) Prior Publication Data

US 2021/0158801 A1 May 27, 2021

(30) Foreign Application Priority Data

Nov. 26, 2019 (KR) .................. 10-2019-0153691

(51) Int. Cl.
| | |
|---|---|
| *G10L 15/08* | (2006.01) |
| *G06F 3/16* | (2006.01) |
| *G06F 17/18* | (2006.01) |
| *G10L 25/27* | (2013.01) |
| *G10L 25/51* | (2013.01) |

(Continued)

(52) U.S. Cl.
CPC ............ *G10L 15/08* (2013.01); *G06F 3/16* (2013.01); *G06F 17/18* (2013.01); *G10L 25/27* (2013.01);

(Continued)

(58) Field of Classification Search
CPC ......... G10L 15/08; G10L 25/51; G10L 25/27; G06F 3/16; G06F 17/18; H04N 21/422; H04N 21/485; H04N 21/42203
See application file for complete search history.

(56) References Cited

U.S. PATENT DOCUMENTS

| | | | |
|---|---|---|---|
| 6,513,005 B1 * | 1/2003 | Qin | ........................ G10L 15/04 704/254 |
| 7,720,683 B1 * | 5/2010 | Vermeulen | .............. G10L 15/04 704/254 |

(Continued)

FOREIGN PATENT DOCUMENTS

| | | |
|---|---|---|
| KR | 20020043771 A | 6/2002 |
| KR | 10-2002-0063665 | 8/2002 |

(Continued)

OTHER PUBLICATIONS

International Search Report and Written Opinion of the International Searching Authority dated Mar. 15, 2021 in International Patent Application No. PCT/KR2020/016700.

(Continued)

*Primary Examiner* — Richemond Dorvil
*Assistant Examiner* — Ethan Daniel Kim
(74) *Attorney, Agent, or Firm* — Staas & Halsey LLP

(57) ABSTRACT

Disclosed is an electronic device recognizing an utterance voice in units of individual characters. The electronic device includes: a voice receiver; and a processor configured to: obtain a recognition character converted from a character section of a user voice received through the voice receiver, and recognize a candidate character having high acoustic feature related similarity with the character section among a plurality of acquired candidate characters as an utterance character of the character section based on a confusion possibility with the acquired recognition character.

20 Claims, 11 Drawing Sheets

(51) Int. Cl.
*H04N 21/422* (2011.01)
*H04N 21/485* (2011.01)

(52) U.S. Cl.
CPC ....... *G10L 25/51* (2013.01); *H04N 21/42203* (2013.01); *H04N 21/485* (2013.01)

(56) References Cited

U.S. PATENT DOCUMENTS

| | | | |
|---|---|---|---|
| 11,127,394 B2* | 9/2021 | Czyryba | ................. G10L 15/16 |
| 2002/0138265 A1 | 9/2002 | Stevens et al. | |
| 2008/0120102 A1* | 5/2008 | Rao | ......................... G10L 15/26 |
| | | | 704/235 |
| 2011/0015927 A1 | 1/2011 | Yu et al. | |
| 2016/0171974 A1 | 6/2016 | Hannun et al. | |
| 2018/0182386 A1 | 6/2018 | Lee et al. | |
| 2021/0019152 A1* | 1/2021 | Pudipeddi | ................. G06F 9/38 |
| 2021/0127003 A1* | 4/2021 | Bai | ....................... H04M 3/493 |

FOREIGN PATENT DOCUMENTS

| | | |
|---|---|---|
| KR | 10-2012-0130399 | 12/2012 |
| KR | 10-2014-0005639 | 1/2014 |
| KR | 10-2018-0074210 | 7/2018 |

OTHER PUBLICATIONS

Partha Niyogi et al.; "The voicing feature for stop consonants: recognition experiments with continuously spoken alphabets", Speech Communication, vol. 41, No. 2-3, Oct. 1, 2003, pp. 349-367, XP055958476.

Lucas Czech: "A System for Recognizing Natural Spelling of English Words", Diploma Thesis Karlsruhe Institute of Technology, Mar. 7, 2014 (Mar. 7, 2014), XP055182790.

Extended European Search Report dated Sep. 14, 2022 in European Patent Application No. 20892373.0 (8 pages).

* cited by examiner

ELECTRONIC DEVICE AND METHOD FOR CONTROLLING THE SAME, AND STORAGE MEDIUM

CROSS-REFERENCE TO RELATED APPLICATION

This application is based on and claims priority under 35 U. S. C. § 119 to Korean Patent Application No. 10-2019-0153691, filed on Nov. 26, 2020, the disclosure of which is herein incorporated by reference in its entirety.

BACKGROUND

1. Field

The disclosure relates to an electronic device capable of recognizing a user voice, a method for controlling the same, and a storage medium.

2. Discussion of Related Art

A large display device such as a TV provides a virtual on-screen keyboard for inputting characters such as alphabets, numbers, and symbols. In addition, a large display device supports connection of a physical keyboard or the like as a means for inputting characters, but is actually limited to a remote control.

In particular, in a situation where physical buttons mapped to alphabets and symbols other than numbers are not supported due to miniaturization and key simplification, a remote control performs character entry by pressing an OK button while moving a focus to the desired characters by pressing a number of arrow keys on the on-screen keyboard. To improve input usability, a method for inputting characters displayed on an on-screen keyboard by voice is being considered. To this end, the character recognition is required in units of individual characters rather than in units of words and sentences.

SUMMARY

An electronic device according to an embodiment of the disclosure is provided. The electronic device includes: a voice receiver; and a processor configured to: obtain a recognition character converted from a character section of a user voice received through the voice receiver, and recognize a candidate character having high acoustic feature related similarity with the character section among a plurality of acquired candidate characters as an utterance character of the character section based on a confusion possibility with the acquired recognition character.

The processor may be configured to convert the user voice received through the voice receiver into a character string, and divide the character string for each character.

The processor may be configured to analyze whether there is a pause section between characters of the character string.

The processor may be configured to assign a low weight to the confusion possibility of the recognition character in which the pause period exists.

The electronic device may further include a memory.

The processor may be configured to store history information on the recognition result of the candidate character in the memory.

The processor may be configured to detect a confusion probability for the plurality of candidate characters based on a confusion matrix.

The processor may be configured to update the confusion matrix based on the history information on the recognition result of the candidate character.

The processor may be configured to detect the similarity with the acoustic feature of the character section based on acoustic feature models of the plurality of pre-stored candidate characters.

The processor may be configured to update the acoustic feature model based on the history information on the recognition result of the candidate character.

The processor may be configured to detect a correction probability by applying the confusion probability detected based on the confusion matrix for the plurality of candidate characters and the similarity with the acoustic feature of the character section detected based on the acoustic feature models for the plurality of pre-stored candidate characters.

A method of controlling an electronic device according to an embodiment of the disclosure is provided. The method for controlling an electronic device includes: obtaining a recognition character converted from a character section of a user voice received through the voice receiver, and recognizing a candidate character having high acoustic feature related similarity with the character section among a plurality of acquired candidate characters as an utterance character of the character section based on a confusion possibility with the acquired recognition character.

A computer-readable storage medium in which a computer program executed by a computer according to an embodiment of the disclosure is stored is provided. The computer program is configured to perform an operation of: obtaining a recognition character converted from a character section of a user voice received through the voice receiver, and recognizing a candidate character having high acoustic feature related similarity with the character section among a plurality of acquired candidate characters as an utterance character of the character section based on a confusion possibility with the acquired recognition character.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
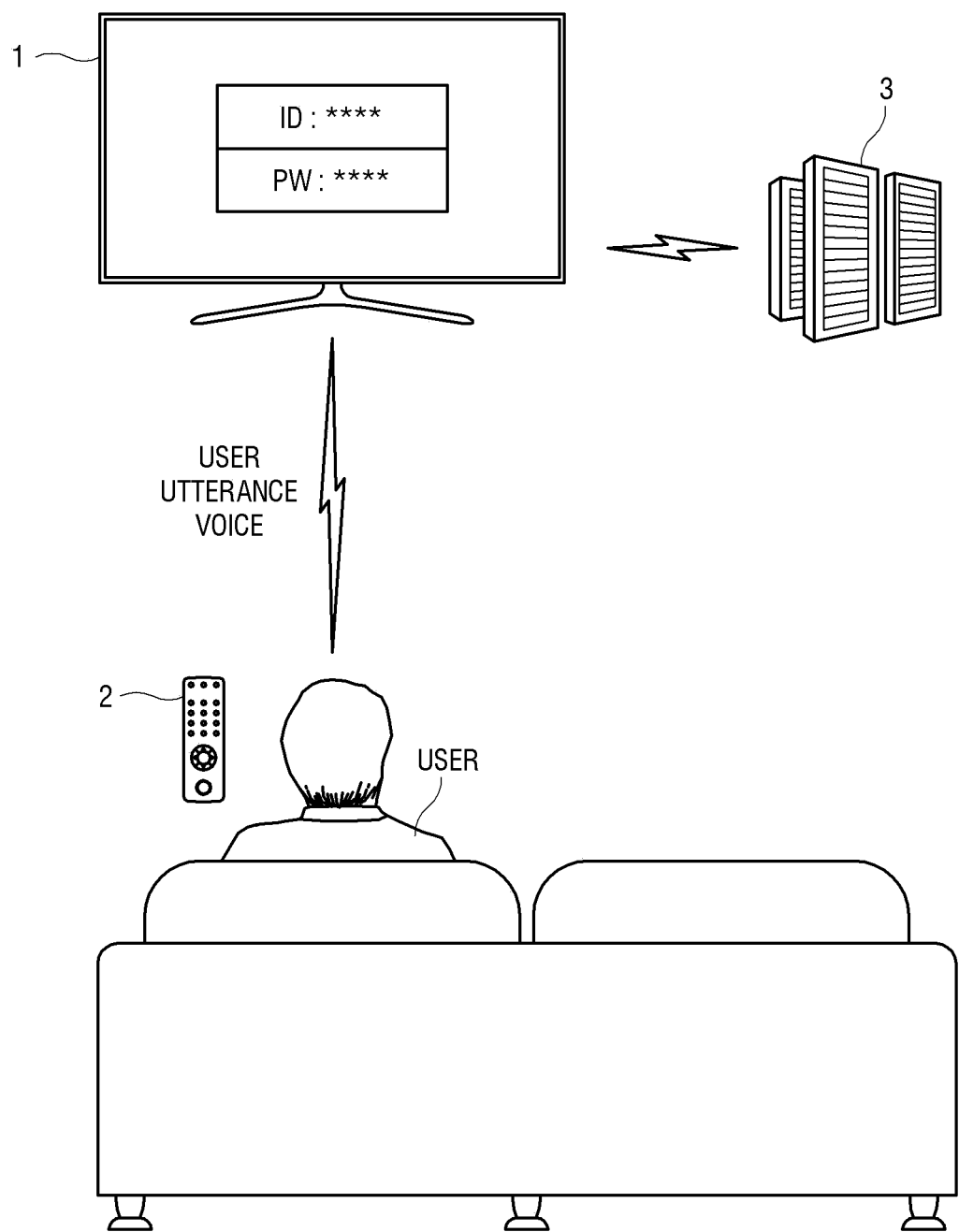
FIG. 1 is a schematic diagram illustrating a voice recognition scenario of an electronic device according to a first embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of (1) a case in which at least one A is included, (2) a case in which at least one B is included, or (3) a case in which both of at least one A and at least one B are included.

In embodiments of the disclosure, terms including ordinal numbers such as first and second are used only for the purpose of distinguishing one component from other components, and singular expressions include plural expressions unless the context clearly indicates otherwise.

In addition, in the embodiment of the disclosure, terms such as 'top', 'bottom', 'left', 'right', 'inside', 'outside', 'inner surface', 'outer surface', 'front', and 'rear' are defined based on the drawings, and shapes or positions of each component are not limited thereby.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "an apparatus configured to" may mean that the apparatus may "do" together with other apparatuses or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

The disclosure is to provide an electronic device capable of improving voice recognition performance, a method for controlling the same, and a storage medium in which a computer program is stored.

An electronic device 1 according to various embodiments of the disclosure may include, for example, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, and a wearable device that recognize voice commands. In some embodiments, the electronic device 1 may include at least one of, for example, a television, a Blu-ray player, a digital video disk (DVD) player, an audio player, a refrigerator, an air conditioner, a cleaner, an oven, a microwave oven, a washing machine, an air cleaner, a set-top box, a home automation control panel, a security control panel, a media box, a game console, an electronic dictionary, an electronic key, a camcorder, and a digital photo frame.

In other embodiments, the electronic device 1 may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, and Internet of things (IoT) devices (for example, a light bulb, various sensors, an electric or gas meter, a sprinkler system, a fire alarm, a thermostat, a street light, a toaster, an exercise equipment, a hot water tank, a heater, a boiler, and the like).

In the disclosure, the term "user" may refer to a person using the electronic device 1 or a device (for example, an artificial intelligence electronic device) using the electronic device 1.

FIG. 1 is a schematic diagram illustrating a voice recognition scenario of an electronic device according to a first embodiment of the disclosure. The electronic device 1 may be implemented as a television (TV) that performs an operation by recognizing a voice uttered by a user. Obviously, the electronic device 1 is not limited to the TV, but may be implemented as various electronic devices capable of receiving and recognizing a voice command uttered by the user.

Referring to FIG. 1, the electronic device 1 may be controlled by the remote control 2 and may be connected to the server 3 through a network.

As an embodiment, the electronic device 1 may receive a voice input of an ID and a password from a user, for example, in an ID area and a password (PW) area. At this time, the electronic device 1 may recognize a user utterance voice, convert the user utterance voice into a character string corresponding to the user utterance voice, and display the character string in the ID area and the password (PW) area.

As another embodiment, when the electronic device 1 performing a voice input of answers, inquiries, and commands in units of alphabets rather than words or sentences, or performing a URL input, for example, performing a voice input in alphabets, numbers, symbols, and the like, the electronic device 1 may recognize and correct the voice input in units of characters.

The electronic device 1 may perform an operation of recognizing the user utterance voice and divide the converted character string in character units, acquiring a plurality of candidate characters based on a confusion possibility for each recognition character, and correcting the user utterance voice with a candidate character having an acoustic feature similar to an acoustic feature in a recognition character section among the plurality of candidate characters.

The remote control 2 may transmit an IR signal for controlling the electronic device 1 or the acquired sound signal to the electronic device 1 using a wireless communication module. The remote control 2 may transmit the voice signal received by the remote control 2 to the electronic device 1 as it is. In addition, the remote control 2 may recognize the voice signal received by the remote control 2, convert the recognized voice signal into a character string, and then transmit the character string to the electronic device 1.

The server 3 may receive the voice signal as it is or the character string converted from the voice signal and/or the extracted acoustic feature from the electronic device 1.

The server 3 may provide a voice recognition service that recognizes the voice signal provided by the electronic device 1 to extract the corresponding character string and verifies the extracted character string to correct misrecognition, a service that provides content, and the like. The server 3 may be implemented as one or more servers for each service.

Figure 2:
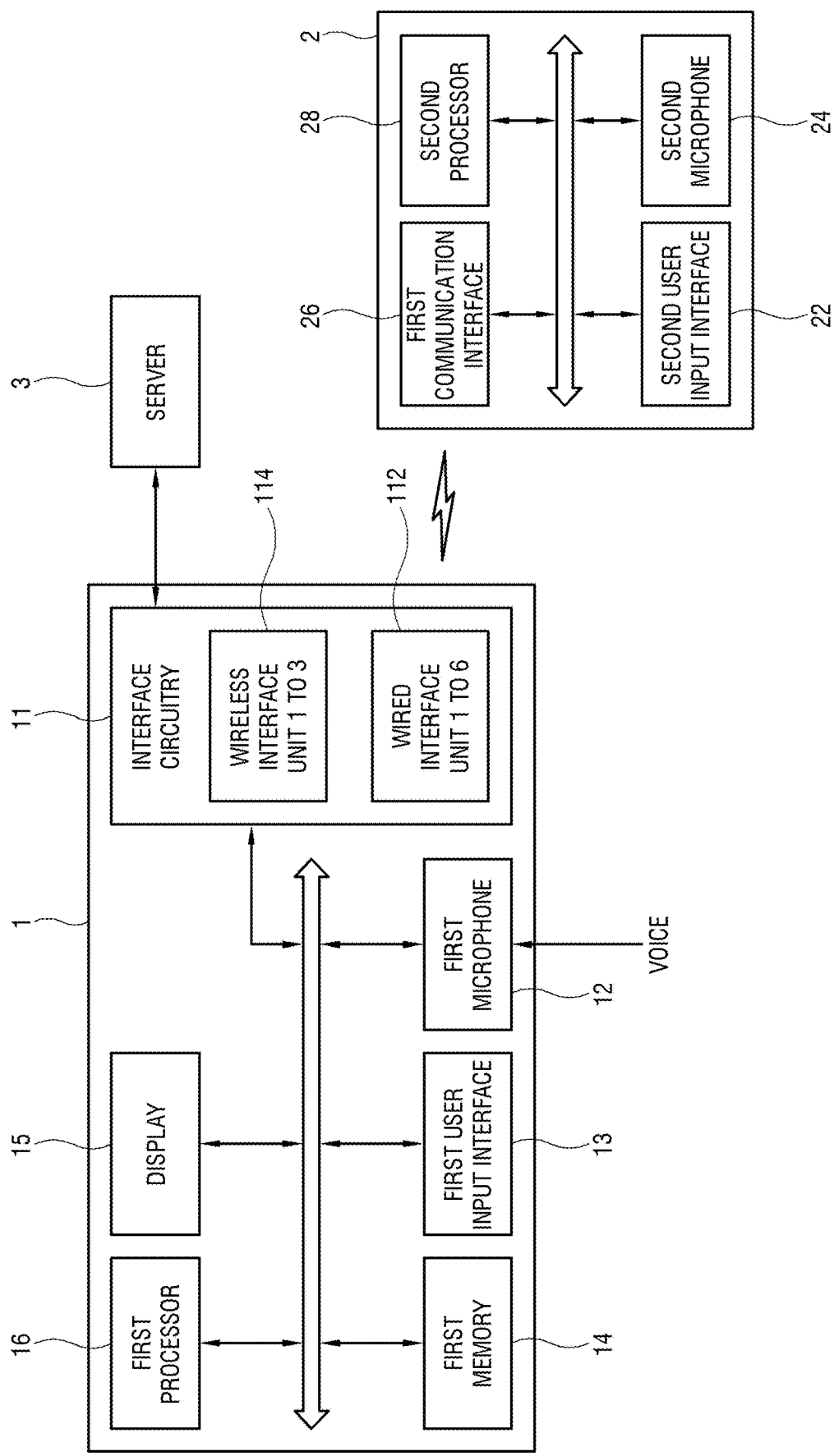
FIG. 2 is a block diagram illustrating a configuration of the electronic device of FIG. 1.

FIG. 2 is a block diagram illustrating a configuration of the electronic device 1 of FIG. 1. The electronic device 1 may include an interface circuitry 11, a first microphone 12, a first user input interface 13, a first memory 14, a display 15, and a first processor 16.

The interface circuitry 11 may receive various contents, video data, audio data, and the like from an external device. In addition, the interface circuitry 11 may indirectly receive a voice to be recognized from an external device.

The interface circuitry 11 may include wired interface circuitries 1 to 6 112 and wireless interface circuitries 1 to 3 114.

The wired interface circuitry 1 may include a terrestrial/satellite broadcasting antenna connection tuner, a connection interface for a cable broadcasting cable, and the like for receiving a broadcast signal.

The wired interface circuitry 2 may include HDMI, DP, DVI, Component, S-Video, composite (RCA terminal), and the like for connecting an image device.

The wired interface circuitry 3 may include a USB interface or the like for a general-purpose electronic device connection.

The wired interface circuitry 4 may include a connection interface for an optical cable device.

The wired interface circuitry 5 may include an audio device connection interface such as a headset, earphones, and external speakers.

The wired interface circuitry 6 may include a connection interface for wired network devices such as Ethernet.

The wireless interface circuitry 1 may include a connection interface for wireless network devices such as Wi-Fi, Bluetooth, ZigBee, Z-wave, RFID, WiGig, WirelessHD, ultra-wide band (UWB), wireless USB, and near field communication (NFC).

The wireless interface circuitry 2 may include an IR transmission/reception module for transmitting and/or receiving a remote control signal.

The wireless interface 3 may include a connection interface for mobile communication devices such as 2G to 5G.

The interface circuitry 11 may include a dedicated communication module for performing communication exclusively for each of the mobile device and the server.

The interface circuitry 11 may include a common communication module and the like for performing communication with the external device.

The interface circuitry 11 may include an input interface circuitry and an output interface circuitry. In this case, the input interface circuitry and the output interface circuitry may be integrated into one module or may be implemented as separate modules.

The first microphone 12 is a voice receiver, and may directly receive voices uttered by the user, such as alphabets, numbers, and symbols, using, for example, an ID and a password. Here, the user utterance voice may include various voice answers, queries, commands, and the like for controlling the electronic device 1 or a device connected to the electronic device 1 through a wired or wireless network, for example, an IoT device.

The first user input interface 13 transmits various preset control commands or unlimited information to the first processor 16 by the user input.

The first user input interface 13 may include a keypad (or input panel) including buttons such as a power key and a menu key provided on the electronic device 1 or a user interface (UI) displayed on the display 15.

According to one embodiment, the first user input interface 13 includes an input device that generates a preset command/data/information/signal to be able to remotely control the electronic device 1 and transmits the generated preset command/data/information/signal to the electronic device 1. The input device is provided to be separated from the main body of the electronic device 1, such as the remote control 2 to be able to receive the user input. The remote control 2 may be provided with a touch sensing unit that receives a user's touch input and/or a motion sensing unit that senses a user's motion. The input device includes a terminal device such as a smartphone in which a remote control application is installed. In this case, the input device may receive the user's touch input through the touch screen.

The input device becomes an external device capable of the wireless communication with the main body of the electronic device 1, and the wireless communication includes the Bluetooth, the infrared communication, the RF communication, the wireless LAN, the Wi-Fi Direct, and the like.

The first memory 14 is a storage medium readable by a computer and stores data without limitation. The first memory 14 is accessed by the first processor 16, and performs operations such as reading, writing, modifying, deleting, and updating data by the first processor 16.

The first memory 14 may store various types of information and contents received through the interface circuitry 11 from the remote control 2, the server 3, the USB, the wirelessly connected mobile device, or the like.

The data stored in the first memory 14 may include, for example, a voice recognition module (voice recognition engine) that recognizes a user voice and converts the recognized user voice into a text string.

The voice recognition module may be excluded from the electronic device 1. At this time, the received voice signal may be transmitted to the server (voice recognition server) 3. The server (voice recognition server) 3 may be a speech to text (STT) server that has a function of converting a voice signal into an appropriate text string, or may be a main server that also performs a function of the STT server. The STT server may again transmit the voice recognition result data to the electronic device 1 or directly transmit the voice recognition result data to another server.

The first memory 14 may store a voice division module that divides a text string recognized by the voice recognition module in units of characters, an utterance type analysis module that analyzes whether the text string is discontinuously uttered or continuously uttered, that is, whether a pause section exists between characters, a confusion matrix that detects a confusion probability of each candidate character determined based on the confusion possibility of each recognition character, and an acoustic feature model corresponding to each candidate character.

The first memory 14 may include an operating system, various applications executable on the operating system, image data, additional data, and the like.

The first memory 14 includes a nonvolatile memory in which a control program is installed, and a volatile memory in which at least a part of the installed control program is loaded.

The first memory 14 may include at least one storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The display 15 may display an image based on the processed image signal. The display 15 may display a UI in which a user directly inputs characters, alphabets, numbers, symbols, and the like.

The implementation scheme of the display 15 is not limited, and the display 15 may be implemented in various display panels such as liquid crystal, plasma, a light-emitting diode, an organic light-emitting diode, a surface-electron gun conduction electron-emitter, carbon nano-tube, and nano-crystal.

The display 15 may additionally include an additional component according to the implementation scheme. For example, the display 15 may include an LCD panel, an LCD panel driver for driving the LCD panel, and a backlight unit for supplying light to the LCD panel.

The display 15 may include an OLED panel without a backlight unit, and an OLED panel driver for driving the OLED panel. The OLED panel may include a self-luminous display device that emits light when a current is applied to a fluorescent organic compound.

The first processor 16 may control each component of the electronic device 1.

The first processor 16 may convert the voice uttered by the user into the text string by executing the voice recognition module stored in the first memory 14.

The first processor 16 may execute the utterance type analysis module stored in the first memory 14 to check whether the pause section exists between each character of the recognized text string, thereby analyzing the user utterance form. That is, the first processor 16 may find out the user utterance form indicating whether each recognition character is discontinuously or continuously uttered.

The first processor 16 may divide the input voice into each character unit using the recognition character string and time information by executing the voice division module stored in the first memory 14.

The first processor 16 may extract candidate characters that can be confused from the prepared confusion matrix based on the confusion possibility for the recognized characters, obtain a confusion probability for candidate characters that can be confused, obtain similarity based on an acoustic feature of a recognition character utterance section and acoustic feature models for a plurality of candidate characters, and finally perform correction by assigning a probabilistic weight according to the user utterance form. Here, the candidate character may include the same character as the recognition character. In addition, the correction may include a case where the recognition character is normally recognized without misrecognition.

The first processor 16 may update the confusion matrix and the acoustic feature model to suit the user by using the result history of the voice recognition and correction of the electronic device 1. Here, the results of the voice recognition and correction may include not only successful results but also failed results.

The confusion matrix and the acoustic feature model may be updated by reflecting the recognition and correction history while the user continuously uses the prepared standard confusion matrix and standard acoustic feature model in an initial state before the user history is accumulated.

In particular, the first processor 16 may collect data for generating the voice recognition model, the confusion matrix, and the acoustic feature model, and may perform at least a part of data analysis, processing, and generation of result information using at least one of machine learning, a neural network, or a deep learning algorithm as a rule-based or artificial intelligence algorithm.

For example, the first processor 16 may perform functions of a learning unit and a recognition unit. The learning unit may perform, for example, a function of generating a trained neural network, and the recognition unit may perform a function of recognizing (or reasoning, predicting, estimating, and determining) data using the trained neural network. The learning unit may generate or update the neural network. The learning unit may obtain learning data to generate the neural network. For example, the learning unit may acquire the training data from the first memory 14 or the outside. The learning data may be data used for learning a neural network.

Before learning the neural network using the learning data, the learning unit may perform a pre-processing operation on the obtained learning data, or select data to be used for learning from among a plurality of learning data. For example, the learning unit may process or filter the learning data in a predetermined format, or process data in a form suitable for learning by adding/removing noise. The trained neural network may be constituted by a plurality of neural networks (or layers). The nodes of the plurality of neural networks have weights, and the plurality of neural networks may be connected to each other so that an output value of one neural network is used as an input value of other neural networks. Examples of the neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

Meanwhile, the recognition unit may acquire target data to recognize and correct the user utterance voice. The target data may be acquired from the first memory 14 or from the outside. The target data may be data to be recognized by the neural network. Before applying the target data to the trained neural network, the recognition unit may perform the pre-processing operation on the obtained target data, or select data to be used for recognition from among the plurality of target data. For example, the recognition unit may process or filter the target data in a predetermined format, or process data in a form suitable for recognition by adding/removing noise. The recognition unit may obtain an output value output from the neural network by applying the pre-processed target data to the neural network. According to various embodiments, the recognition unit may acquire a probability value (or a reliability value) together with the output value.

The first processor 16 includes at least one general-purpose processor that loads at least a part of the control program including instructions from the nonvolatile memory, in which the control program is installed, into the volatile memory and executes the loaded instructions of the control program, and may be implemented as, for example, a central processing unit (CPU), an application processor (AP), or a microprocessor.

The first processor 16 may include a single core, a dual core, a triple core, a quad core, or a multiple-number core thereof. A plurality of first processors 16 may be provided. The first processor 16 may include, for example, a main processor and a sub processor operating in a sleep mode (for example, a mode in which only standby power is supplied). In addition, the processor, the ROM, and the RAM can be interconnected via an internal bus.

The first processor 16 may be implemented as a form included in a main SoC mounted on a PCB embedded in the electronic device 1. In another embodiment, the main SoC may further include an image processor.

The control program may include a program(s) implemented in at least one of a BIOS, a device driver, an operating system, firmware, a platform, and an application program (application). The application program may be pre-installed or pre-stored at the time of manufacturing of the electronic device 1, or may be installed based on data of the application program received from the outside when used later. The data of the application program may be downloaded to the electronic device 1 from an external server such as an application market. Such a server is an example of a computer program product, but is not limited thereto.

The remote control 2 may include a second user input interface 22, a second microphone 24, a first communication interface 26, and a second processor 28.

The remote control 2 may be implemented as an IR remote control that transmits 2-bit control information based only on the IR signal, a multi-brand remote (MBR) that transmits user input information input by, for example, buttons, voice, touch, drag, and the like, as an IR signal, a Bluetooth signal, a Wi-Fi signal, and the like, mobile terminals such as a smartphone in which a remote application (app) is installed, or the like.

The second user input interface 22 may receive a button input through various function key buttons, a touch or drag input through a touch sensor, a voice input through the second microphone 24, a motion input through a motion sensor, and the like.

The second microphone 24 may receive the voice signal. In this way, the analog signal of the received voice signal may be converted into a digital signal and transmitted to a control target, for example, the electronic device 1 through the first communication interface 26, for example, a Bluetooth communication module, a Wi-Fi communication module, an infrared communication module, or the like. When the remote control 2 is implemented as a mobile terminal such as a smartphone having a voice recognition function, the input voice input may be transmitted to the electronic device 1 in the form of a code signal form corresponding to the character string recognized by the voice recognition.

The analog voice signal received by the second microphone 24 may be converted into a digital signal and transmitted to the electronic device 1 through, for example, Bluetooth.

The first communication interface 26 may transmit the analog sound signal input from the second microphone 24 as a digital sound signal to the electronic device 1.

In order to perform wireless communication, the first communication interface 26 may be configured to perform at least one communication of IR, radio frequency (RF), Wi-Fi, Bluetooth, ZigBee, ultra-wide band (UWB), wireless USB, and near field communication (NFC).

The second processor 28 may control each component of the remote control 2. The second processor 28 may transmit a control command corresponding to a button input, a touch input, a drag input, and a motion input to the electronic device 1 through the first communication interface 26.

The second processor 28 may convert the analog voice signal input through the second microphone 24 into the digital sound signal and transmit the digital sound signal to the electronic device 1 through the first communication interface 26. The second processor 28 may execute the voice recognition module to recognize the input voice signal and transmit the converted text to the electronic device 1 through the first communication interface 26.

Figure 3:
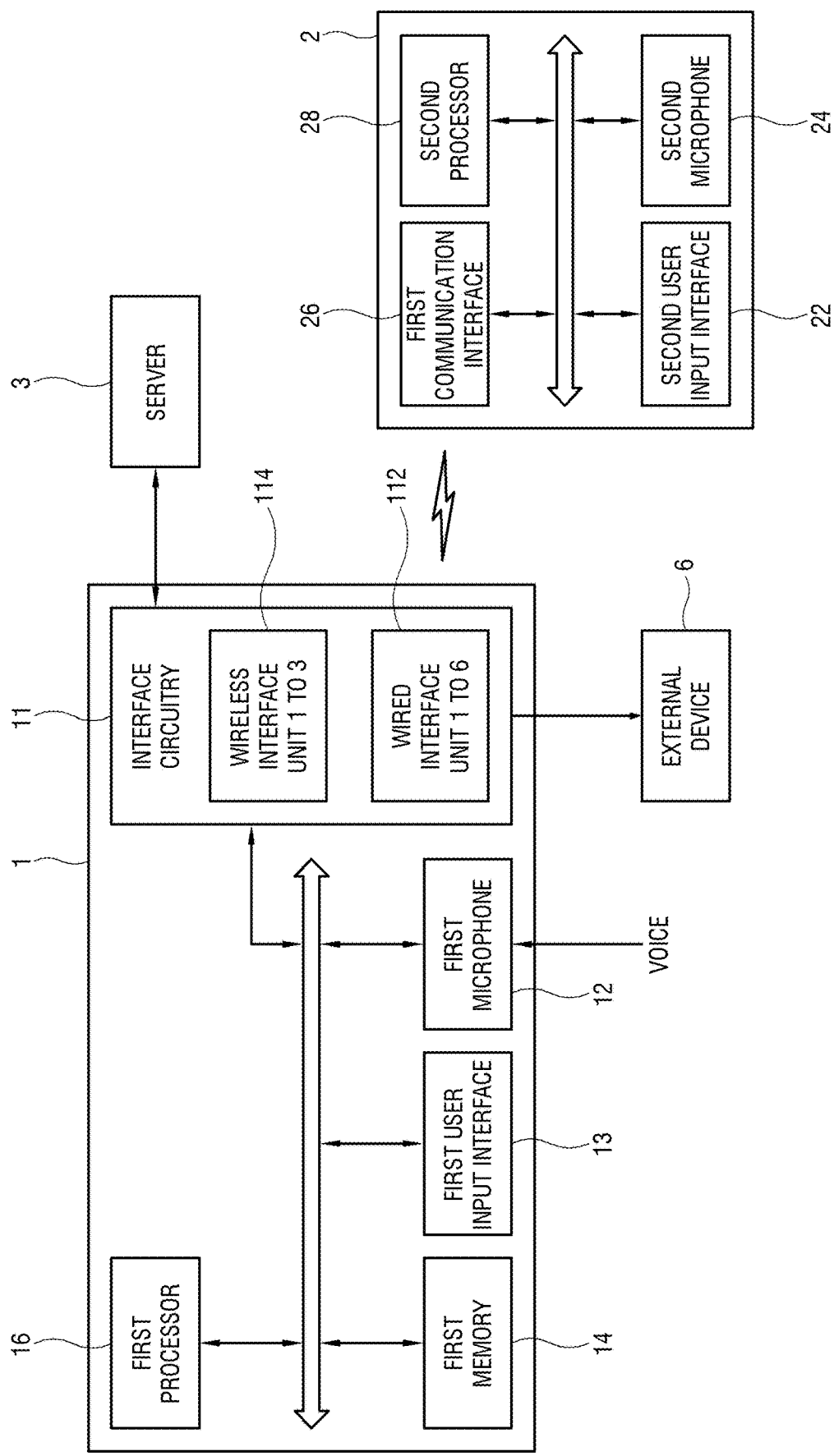
FIG. 3 is a block diagram illustrating a configuration of an electronic device according to a second embodiment of the disclosure.

FIG. 3 is a block diagram illustrating a configuration of an electronic device 1 according to a second embodiment of the disclosure. The electronic device 1 according to the second embodiment may output image content or a control signal to an external device 6. For example, the electronic device 1 may output an image to a display device, audio to an audio device, and a control signal to an IoT device.

Obviously, the electronic device 1 according to the second embodiment may include a display that displays a simple notification, a control menu, or the like.

The electronic device 1 according to the second embodiment may include an interface circuitry 11, a first microphone 12, a first user input interface 13, a first memory 14, and a first processor 16. Hereinafter, description of the same configuration as in FIG. 2 is omitted, and only other configurations are described.

Unlike the electronic device 1 according to the first embodiment, the electronic device 1 according to the second embodiment transmits data processed by the first processor 16, such as a voice, an image, or a control signal, to the external device 6 through the interface circuitry 11.

Figure 4:
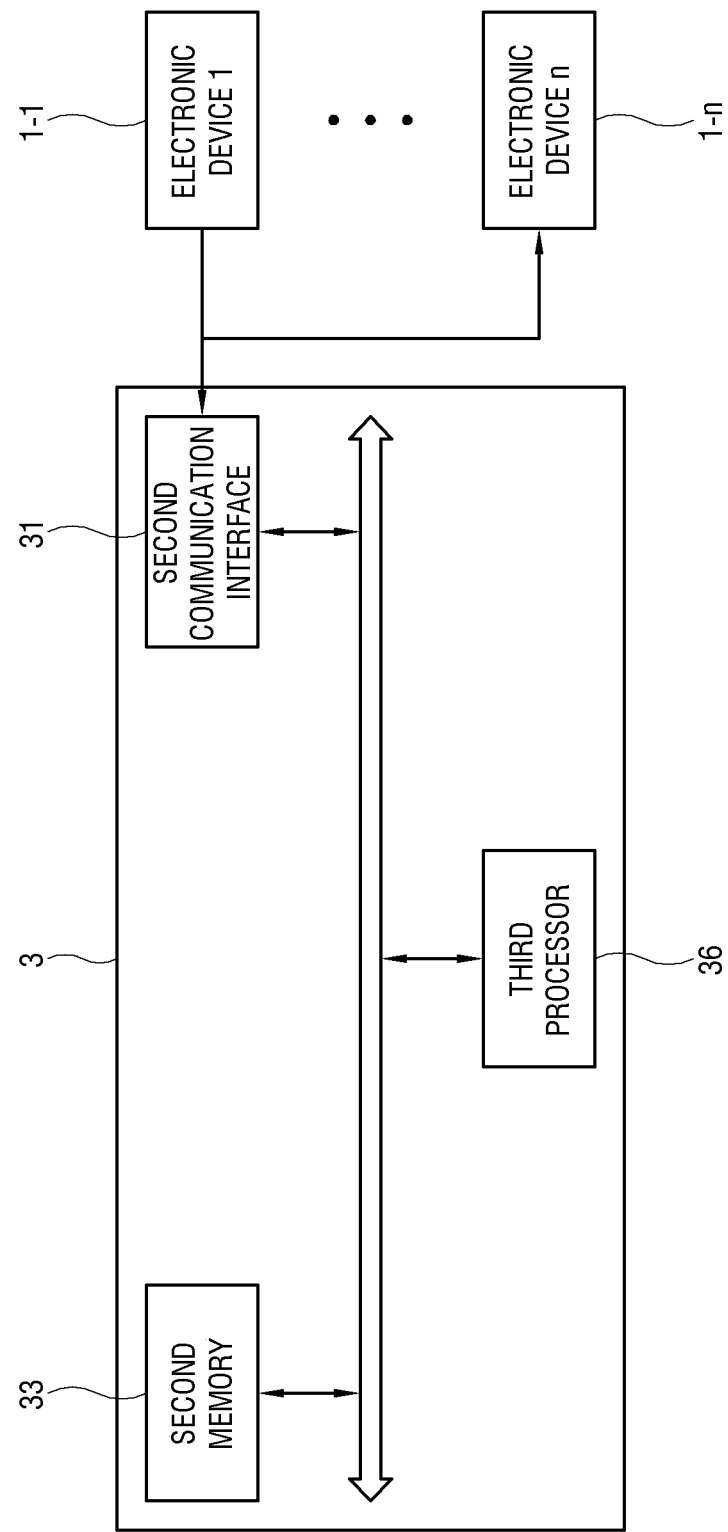
FIG. 4 is a block diagram illustrating a configuration of a server according to the embodiment of the disclosure.

FIG. 4 is a block diagram illustrating a configuration of the server 3 according to the embodiment of the disclosure.

Referring to FIG. 4, the server 3 may include a second communication interface 31, a second memory 33, and a third processor 36. The server 3 may be a voice recognition server or a content server. The server 3 may include both the voice recognition server and the content server.

The second communication interface 31 performs network communication with a plurality of electronic devices 1-1 to 1-*n*. When the electronic devices 1-1 to 1-*n* do not have a voice signal recognition function, the electronic devices 1-1 to 1-*n* may transmit the voice signal uttered by the identified user to the server 3. The second communication interface 31 may collect a voice recognition model, a confusion matrix, and an acoustic feature model used when each of the plurality of electronic devices 1-1 to 1-*n* recognize and correct the voice signal.

The second communication interface 31 may transmit or update the standard voice recognition model, the standard confusion matrix, the standard acoustic feature model, and the like collected, learned, and generated under the control of the third processor 36 to the electronic devices 1-1 to 1-*n*.

The second communication interface 31 may transmit a result of performing the voice recognition to the electronic device that has transmitted a voice signal for voice recognition among the electronic devices 1-1 to 1-*n*.

In order to perform wireless communication with, for example, the plurality of electronic devices 1-1 to 1-*n*, the second communication interface 31 may include an RF circuit that transmits/receives a radio frequency (RF) signal, and may be configured to perform at least one communication of Wi-Fi, Bluetooth, ZigBee, ultra-wide band (UWB), wireless USB, and near field communication (NFC). The second communication interface 31 may perform wired communication with the plurality of electronic devices 1-1 to 1-*n* and other devices through a wired local area network (LAN). Communications may be implemented in various other communication schemes in addition to connection units including a connector or a terminal for wired connection.

The second memory 33 may include various types of data without limitation.

The second memory 33 may store a voice recognition module (voice recognition engine) when the server 3 is a voice recognition server.

The third processor 36 may acquire a character string obtained by converting the voice signal uttered by the user into the text based on the voice recognition module (voice recognition engine) and the voice recognition model stored in the second memory 33.

The third processor 36 may generate the voice recognition model, the confusion matrix, the acoustic feature model by collecting, processing, analyzing, and learning data related to the voice recognition and correction in advance.

The voice recognition model, the confusion matrix, and the acoustic feature model may be generated by data collection, processing, and various model learning processes necessary for voice recognition using the same by the data processing and model generation. The data processing may collect, select, and process data to generate a voice corpus, information on word pronunciation, and a sentence corpus. In addition, in the model generation, acoustic modeling, pronunciation modeling, and language modeling are performed using data-processed information, so that a phoneme adaptation model, a pronunciation dictionary model, and a language model may be generated, respectively.

The third processor 36 may generate the voice recognition model, the standard confusion matrix, and the standard acoustic feature model, and distribute the generated voice recognition model, the standard confusion matrix, and the standard acoustic feature model to the electronic devices 1-1 to 1-*n*.

Figure 5:
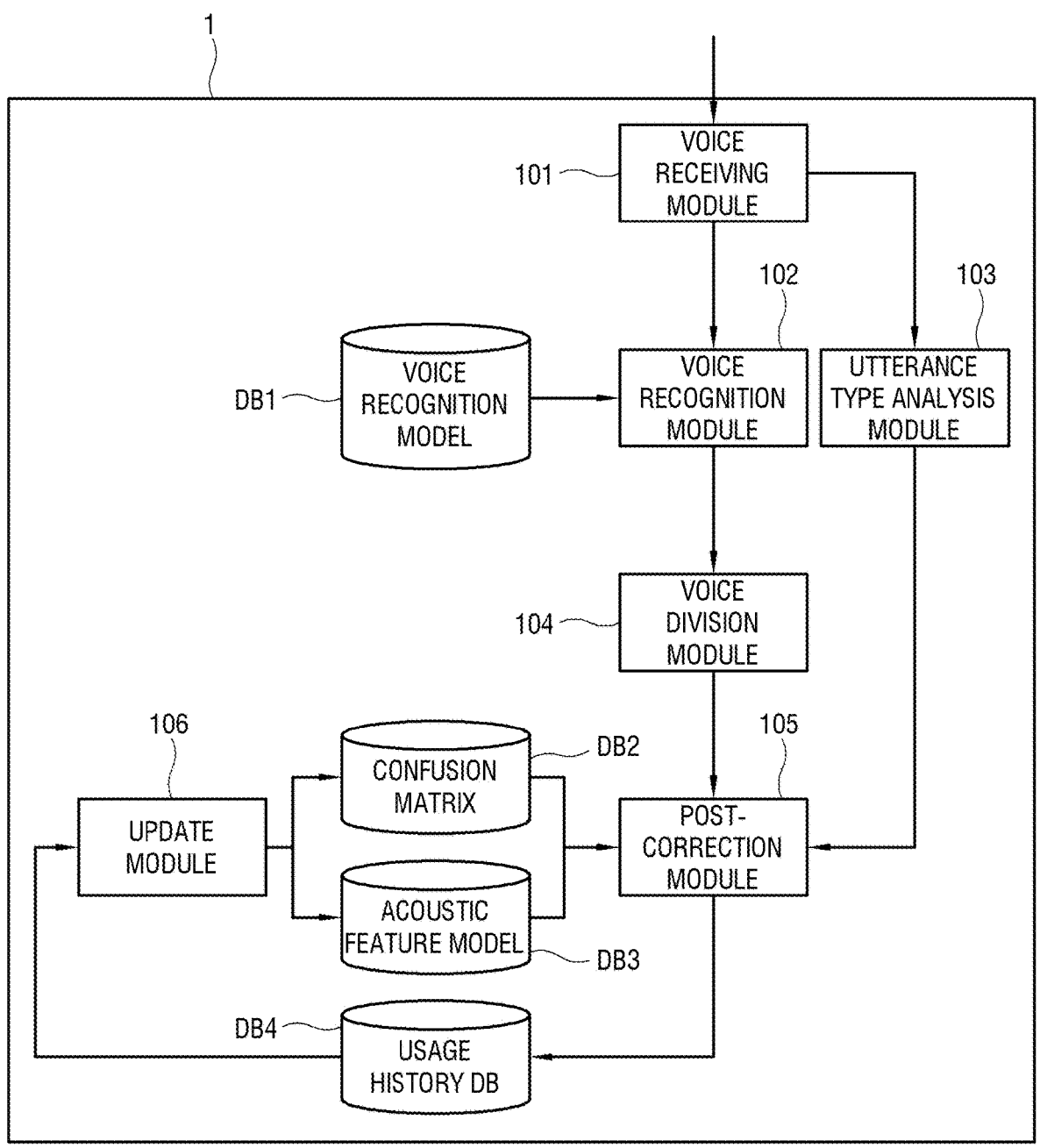
FIG. 5 is a block diagram illustrating a configuration for recognizing and processing a user utterance voice in the electronic device according to the embodiment of the disclosure.

FIG. 5 is a block diagram illustrating a configuration for recognizing and processing a user utterance voice in the electronic device 1 according to the embodiment of the disclosure.

Referring to FIG. 5, the electronic device 1 includes a voice receiving module 101, a voice recognition module 102, an utterance type analysis module 103, a voice division module 104, a post-correction module 105, and an update module 106. Each module may be a software program that may be executed by the first processor 16. Further, each module may be implemented by one or more hardware for example a receiver, a processor and/or any computing apparatus or device.

The voice receiving module 101 receives a voice signal via the first microphone 12 or a third-party device. The voice signal is a user utterance voice to be recognized, and may include an analog signal for a user answer, query, or command voice, or a digital signal obtained by converting the analog signal.

As an embodiment, the voice may include a voice in units of characters uttered by a user using alphabets, numbers, and symbols input for inputting an ID, a password, a URL, and an answer.

The voice recognition module 102 may recognize the voice signal as a text string corresponding to the received user utterance voice signal based on a voice recognition model DB1. The voice recognition module 102 may extract acoustic features of each character section.

The utterance type analysis module 103 may analyze whether the received user utterance voice is continuously or discontinuously uttered. In other words, it is possible to detect whether a pause section exists between each character in a character string converted into text by recognizing the user utterance voice.

The voice division module 104 may divide the text string recognized by the voice recognition module 102 into each character unit.

The post-correction module 105 may perform verification (correction) on each recognition character divided by the voice division module 104.

The post-correction module 105 may extract a plurality of candidate characters using a prepared confusion matrix DB2 based on the confusion possibility for the recognition character, and obtain the confusion probability for each candidate character. Here, the candidate character may include only the same one character as the recognized character when the candidate character is likely to be confused, that is, is not misrecognized and is clear.

The post-correction module 105 may detect similarities of each candidate character for the acoustic feature of the recognition character section based on an acoustic feature model DB3.

The post-correction module 105 may obtain the correction probability for the recognized character by reflecting weight information according to the utterance type information to a product of the confusion probability and the similarity between the acoustic features.

The post-correction module 105 may store, in a usage history DB DB4, information on history information recognized or corrected by the post-correction module 105, for example, a recognition character, an acoustic feature of a recognition character section, an extracted candidate character, a finally determined candidate character, and the like.

The update module 106 may update the confusion matrix DB2 and the acoustic feature model DB3 by referring to a usage history DB DB4.

Hereinafter, a user voice recognition and correction method according to an embodiment of the disclosure will be described in detail.

Figure 6:
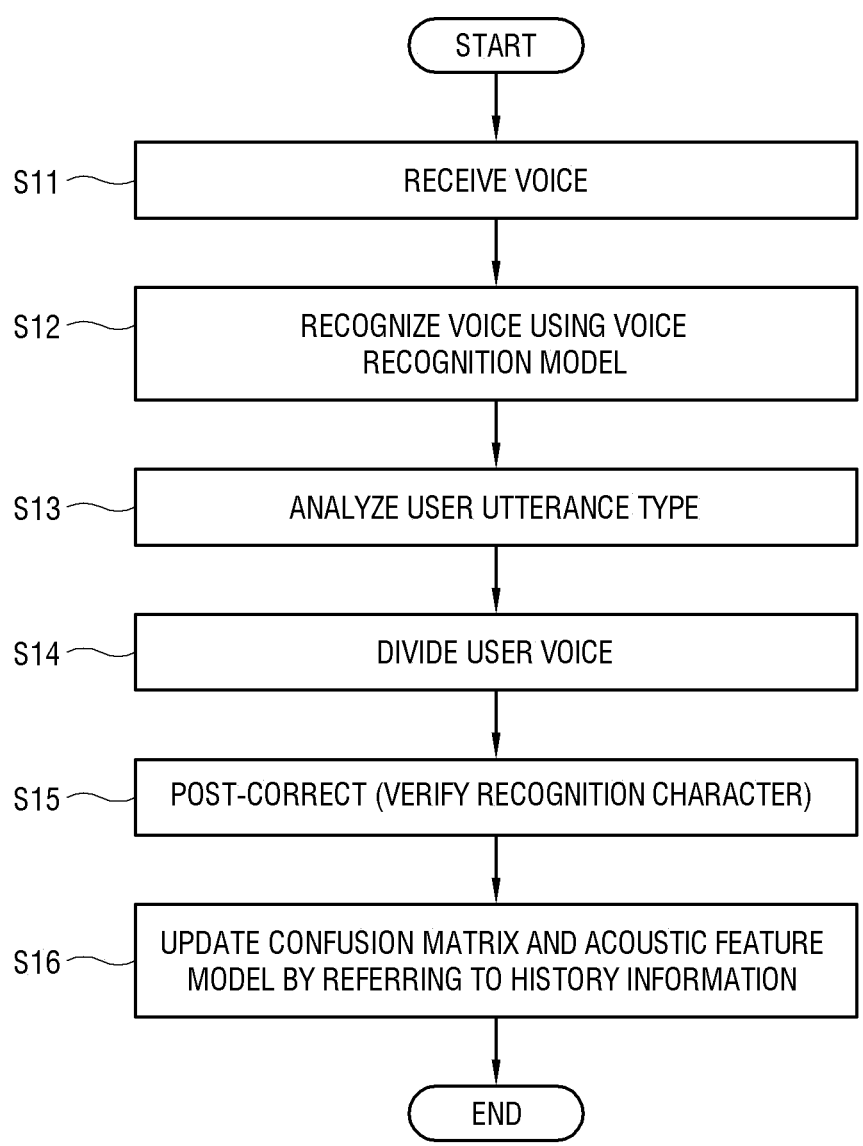
FIG. 6 is a flowchart illustrating a method for recognizing and correcting a voice uttered by a user.
Figure 7:
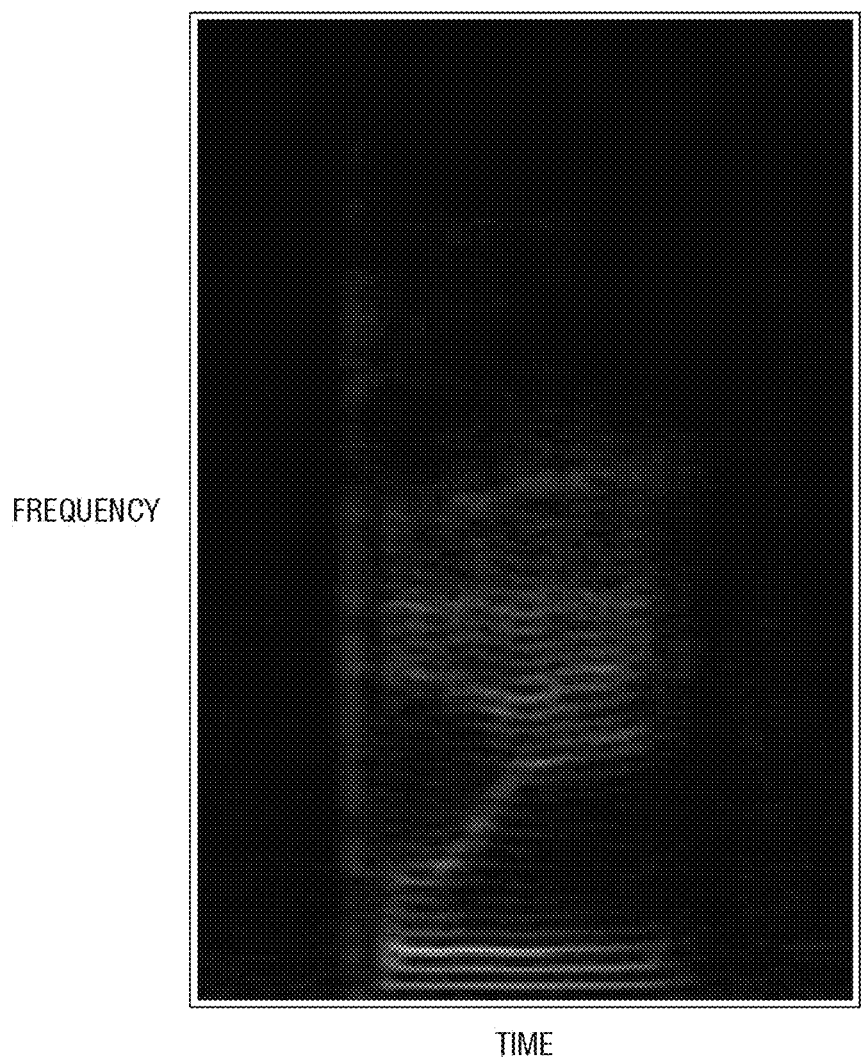
FIG. 7 is a diagram illustrating an acoustic feature of a recognition character.

FIG. 6 is a flowchart illustrating a method for recognizing and correcting a voice uttered by a user, FIG. 7 is a diagram illustrating an acoustic feature of a recognition character, and FIGS. 8 to 11 each illustrate acoustic feature models of candidate characters 'v', 'b', 've', and 'be'.

In operation S11, the voice receiving module 101 receives the voice signal via the first microphone 12 or the third-party device. The voice signal may include a voice signal in units of characters uttered by a user using alphabets, numbers, and symbols input for inputting an ID, a password, a URL, an answer. The voice receiving module 101 may receive, for example, a voice signal in which the user utters an ID 'vod'.

In operation S12, the voice recognition module 102 may recognize (convert) the voice signal as (into) a text string from the received user utterance voice signal based on the voice recognition model DB1. For example, the voice recognition module 102 may recognize the ID 'vod' uttered by the user as "veod". In addition, the voice recognition module 102 may extract acoustic features of each recognition character section.

The recognition of the user utterance voice may include processes of natural language understanding (NLU), natural language generation (NLG), and text-to-sentence.

The voice recognition model DB1 may be generated by collecting, processing, and learning data related to voice recognition in advance.

The voice recognition model DB1 may perform data collection, processing, and various model learning processes necessary for voice recognition using the same by the data processing and model generation. The data processing may collect, select, and process data to generate a voice corpus, information on word pronunciation, and a sentence corpus. In addition, in the model generation, acoustic modeling, pronunciation modeling, and language modeling are performed using data-processed information, so that a phoneme adaptation model, a pronunciation dictionary model, and a language model may be generated, respectively.

In operation S13, the utterance type analysis module 103 may analyze whether the received user utterance voice is continuously or discontinuously uttered. In other words, it is possible to detect whether a pause section exists between each character in a character string converted into text by recognizing the user utterance voice. For example, a voice input as an ID or a password is pronounced by being divided into each character, that is, a recognition character with a pause section has a low weight for a confusion possibility. The utterance type analysis module 103 may analyze whether the utterance is made by being completely divided into 'v e o d', is partially continuously made as 've o d', or is completely continuously made as 'veod'.

In this way, it is possible to improve a character recognition rate in units of individual characters by discriminating whether the user utterance type is a continuous sound or a single sound and reflecting the discriminated user utterance type to the confusion probability.

In operation S14, the voice division module 104 may divide the text string recognized by the voice recognition module 102 into each character unit. For example, when the user utterance voice is recognized as 'veod', the user utterance voice may be divided into 'v', 'e', 'o', and 'd'. In particular, 've' including a second recognition character is a character that can be confused with 'v', so the 'v' and 've' are considered together. In this way, by dividing the character string corresponding to the user utterance voice into individual characters, it is possible to clarify the correction target for contrast with the confusing candidate characters.

In operation S15, the post-correction module 105 may perform verification (correction) on each recognition character divided by the voice division module 104 as follows.

First, the post-correction module 105 may extract a plurality of candidate characters using the prepared confusion matrix DB2 based on the confusion possibility for the recognition character, and obtain the confusion probability for each candidate character. Here, the candidate character may include only the same one character as the recognized character when the candidate character is likely to be confused, that is, is not misrecognized and is clear.

The confusion matrix DB2 is a table in which the confusing candidate characters are mapped to the recognition character of the user utterance voice, for example, the number of times the recognition character 'v' is confused with 'v', 'b', 've', and 'be' is mapped. The confusion matrix DB2 may be generated by collecting, processing, and learning the history of the confusing candidate characters for all characters, that is, alphabets, numbers, and symbols.

As an embodiment, the electronic device 1 may be applied with the standard confusion matrix at an initial stage in which the user utterance voice recognition and correction are not performed. The standard confusion matrix may be generated by collecting, processing, and learning voice recognition and correction data, for example, received from many electronic devices connected to the server, and may be distributed or updated to each electronic device.

The standard confusion matrix may be gradually updated to a user-friendly confusion matrix DB2 by continuously accumulating the results obtained by performing the user utterance voice recognition and correction while being provided in the electronic device 1. The confusion matrix DB2 may add a new candidate character according to each user's unique utterance while reflecting the result of the user utterance recognition and correction.

Table 1 below shows the confusion matrix of the candidate characters for the recognition character v. For example, based on results obtained by performing the recognition and correction 100 times, a positive recognition probability (Pc (v/v)) that the recognition character v is recognized as the candidate character is 65%, a confusion probability (Pc (b/v)) that the recognition character v is recognized as b is 9%, a confusion probability (Pc (ve/v)) that the recognition character v is recognized as ve is 24%, and a confusion probability (Pc(be/v)) that the recognition character v is recognized as be is 2%. According to the standard confusion matrix, the positive recognition that v is v—65%, that is, the probability that there is no confusion possibility, and the probability of being confused with b—9%, ve—24%, and be—2% may be obtained.

TABLE 1

| | v (Candidate character) | b (Candidate character) | ve (Candidate character) | be (Candidate character) |
|---|---|---|---|---|
| v (Recognition character) | 65 | 9 | 24 | 2 |

Second, the post-correction module 105 may detect similarities of each candidate character for the acoustic feature of the recognition character section based on the acoustic feature model DB3. For example, the similarities Pt (v/v), Pt (b/v), Pt (ve/v), and Pt (be/v) of each candidate character v, b, ve, be through template matching between the acoustic feature of the voice section divided into 'v' and the acoustic feature model pre-stored through the previous usage history may be obtained.

The acoustic feature model DB3 may be generated by collecting, processing, and learning the acoustic features of each candidate character, for example, a pitch, an utterance pattern, and the like which are pre-stored through the previous usage history. The acoustic feature may differ for each user even if the same character is uttered.

The acoustic feature of 'v' uttered by the user is illustrated in FIG. 7. The acoustic feature may be indicated as, for example, a spectrogram expressed in terms of the frequency and time of the recognized voice signal.

The acoustic features of the candidate characters 'v', 'b', 've', and 'be' pre-stored in the acoustic feature model DB3 are as illustrated in FIGS. 8 to 11, respectively. The post-correction module 105 may extract the similarity of the acoustic feature of FIG. 7 with the acoustic feature model of FIGS. 8 to 11 through the template matching. For the template matching of the acoustic feature, the similarities may be determined by overlapping points generated when the waveforms of the recognition character 'v' and the candidate characters 'v', 'b', 've', and 'be', respectively, overlap each other. For example, the recognized acoustic characteristics in FIG. 7 may be compared with the acoustic features of each of the pre-stored candidate characters 'v', 'b', 've', and 'be' illustrated in FIGS. 8 to 11.

The post-correction module 105 may apply a standard acoustic feature model generated and distributed by a server or an external device at an initial stage before the result history obtained by recognizing and correcting the user utterance voice is accumulated. The standard acoustic feature model can be updated to the acoustic feature model DB3 suitable for the user, that is, reflecting the acoustic feature of the user utterance voice as the result history obtained by continuously recognizing and correcting the user utterance voice in the electronic device 1 is accumulated.

Third, the post-correction module 105 may obtain the correction probability for the recognized character 'v' by reflecting weight information according to the utterance type information to a product of the confusion probability and the similarity between the acoustic features.

$$p_v(\theta) = \max_{\theta \in \{v,b,ve,be\}} p_c(\theta|v) p_t(\theta|v) w(\theta)$$

Here, the weight information according to the utterance type information is less influenced by the continuous sound when the utterance is made by being divided into each character, and thus, 'v' and 'b' may have a higher probability of being positively recognized than 've' and 'be'. Therefore, w(v) and w(b) may be set to have a higher weight than w(ve) and w(be). In addition, when the utterance is made continuously, all of them may be set to have a uniform value.

Next, for the recognized character 've', the confusion probability and the similarity between the acoustic features are obtained in the same manner as in V, and then the correction probability may be obtained.

$$p_{ve}(\theta) = \max_{\theta \in \{v,b,ve,be\}} p_c(\theta|ve) p_t(\theta|ve) w(\theta)$$

The post-correction module 105 may compare the correction probabilities obtained for 'v' and 've' and then correct the final recognition result with a candidate character having the highest correction probability.

$$p_{max}(\theta) = \max(p_v(\theta), p_{ve}(\theta))$$

$$Char_{correct} = \arg\max_{\theta \in \{v,b,ve,be\}} p_{max}(\theta)$$

For example, if $p_{vs}(\theta)$ is greater than $p_v(\theta)$ and θ is 'v', the recognized character 've' may be corrected to 'v' and output.

Figure 8:
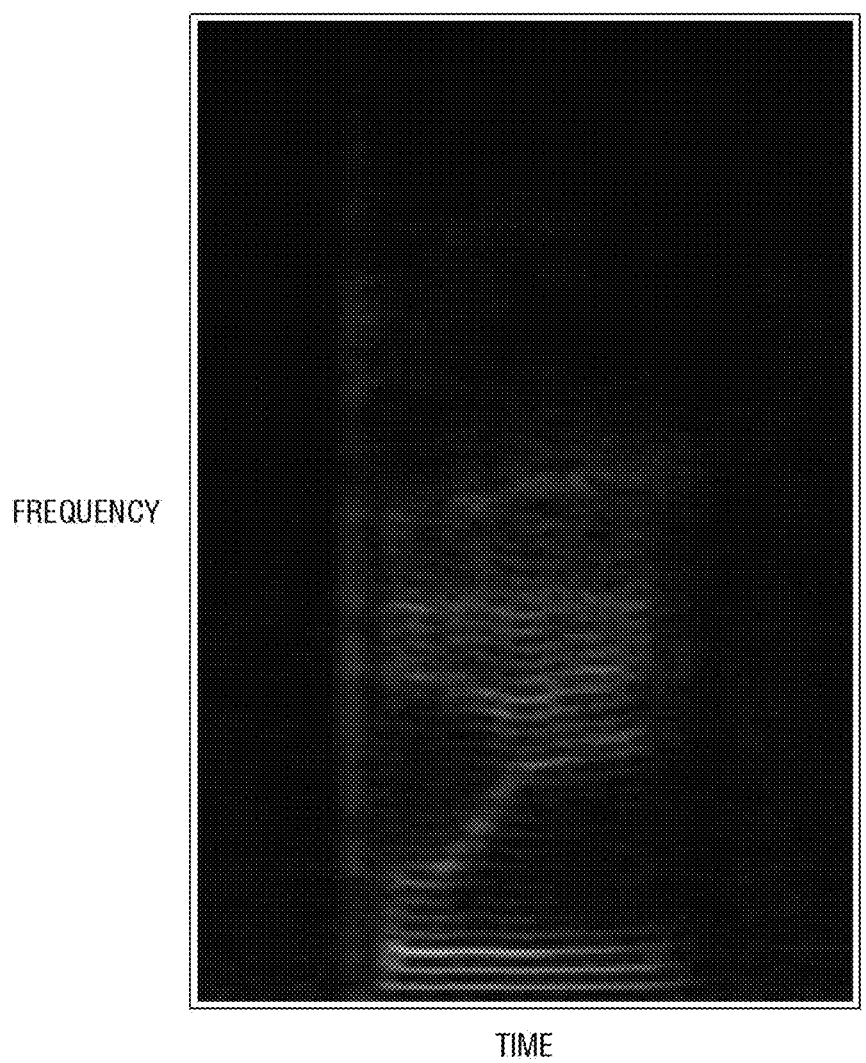
FIG. 8 is a diagram illustrating an acoustic feature model for a candidate character 'v'.
Figure 9:
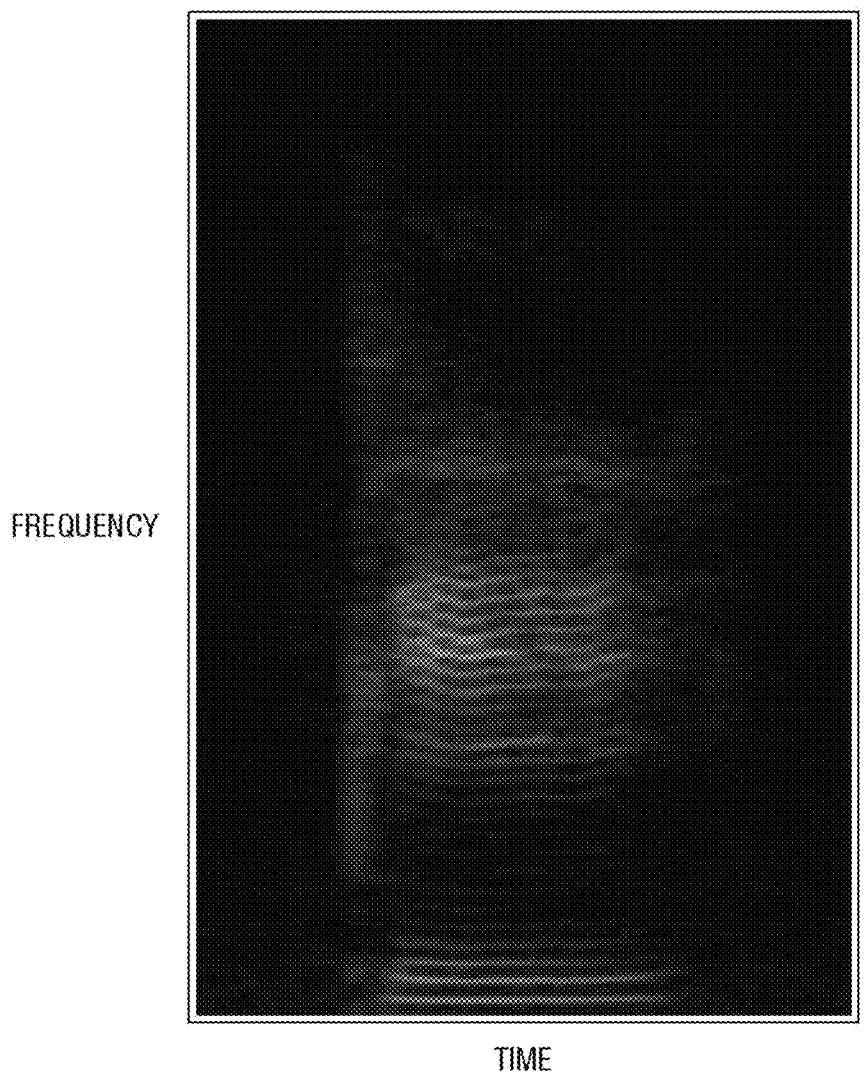
FIG. 9 is a diagram illustrating an acoustic feature model for a candidate character 'b'.
Figure 10:
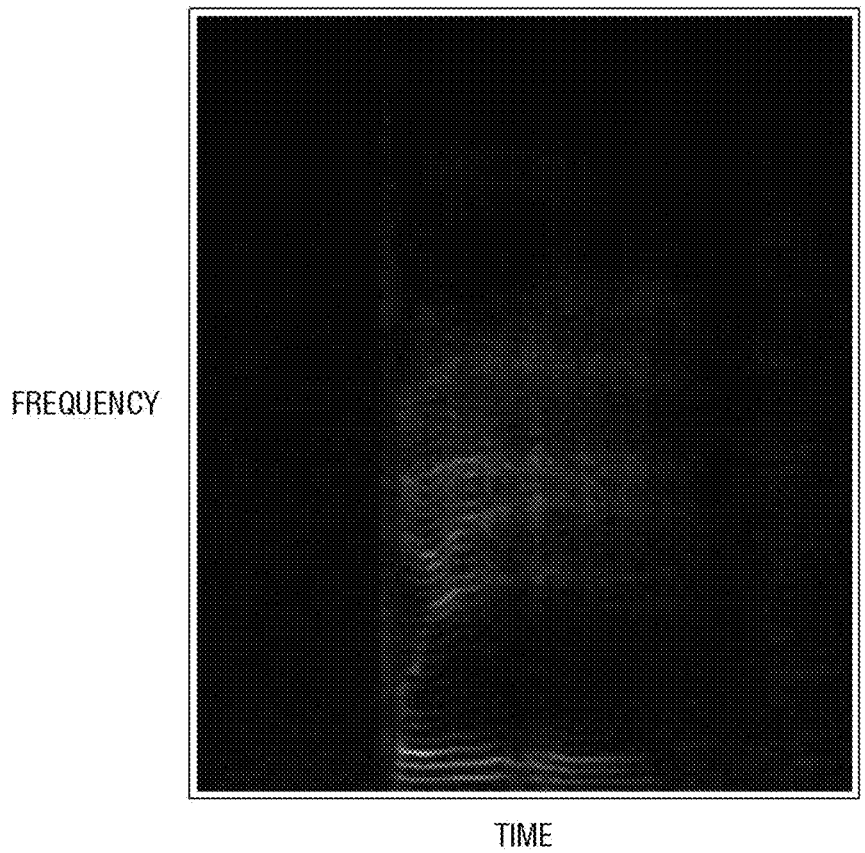
FIG. 10 is a diagram illustrating an acoustic feature model for a candidate character 've'.
Figure 11:
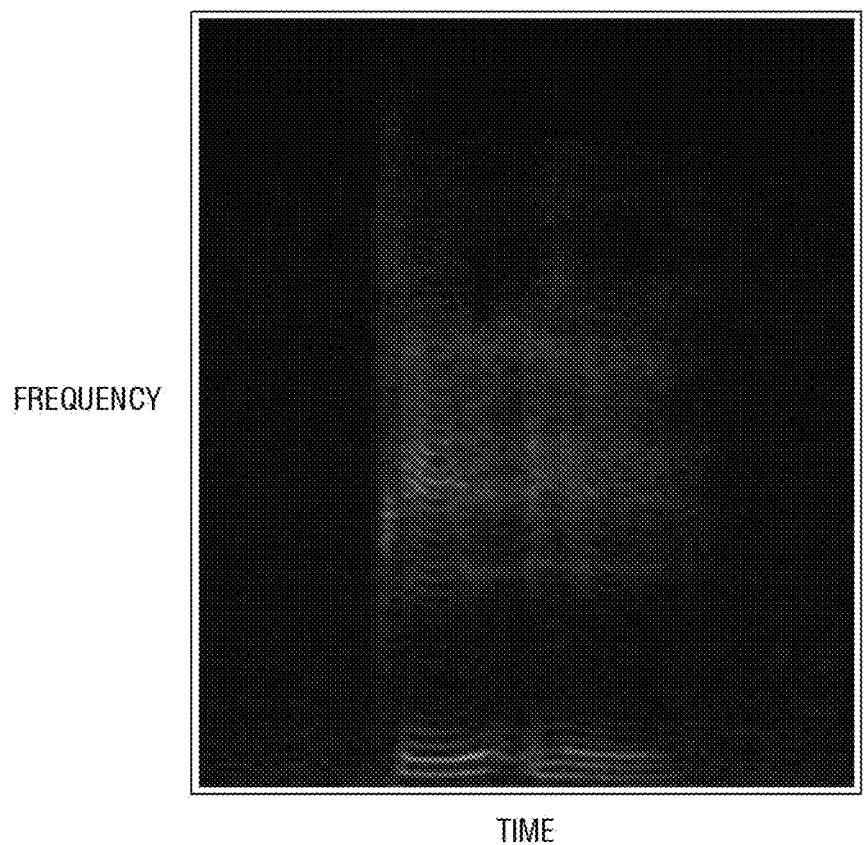
FIG. 11 is a diagram illustrating an acoustic feature model for a candidate character 'be'.

As described above, when the user's intended utterance character is 'v' but is misrecognized as 've', the post-correction module 105 may determine the confusing candidate characters 'v', 'b', 've', and 'be' of 'v' or 've' and then determine the similarity based on the comparison of the acoustic feature of the recognized character in FIG. 7 with the acoustic features of the pre-stored candidate characters 'v', 'b', 've', and 've' in FIGS. 8 to 11 and correct the recognized 've' to 'v' since the recognized 've' is the most similar to the acoustic feature of 'v' in FIG. 8.

When 'v' is positively recognized or corrected, the post-correction module 105 may sequentially perform the post-correction process on 'e', 'o', and 'd'. If 've' is positively recognized or corrected, the final recognition result may be output through the sequential post-correction process for 'o' and 'd'.

The post-correction module 105 may finally store the history information of the execution result of the previous operations S11 to S15 in the usage history DB DB4. The history information may include recognition failure information as well as recognition and/or correction success result information.

In operation S16, the update module 106 may update the confusion matrix DB2 and the acoustic feature model DB3 by referring to the history information stored in the usage history DB DB4. The updated confusion matrix DB2 and the acoustic feature model DB3 are applied to the user voice recognition and correction in the future, and thus are gradually changed to be user-friendly, so the recognition rate may be improved.

As described above, the voice recognition and correction method of the disclosure may detect the confusion probability of the confusing characters and the similarity probability due to voice characteristics based on the user's history to post-correct the recognized characters, thereby increasing the recognition rate in units of characters.

As another embodiment, the user may pre-register the acoustic feature corresponding to the recognition character by inputting a character or a character string through the first user input interface 13 of the electronic device 1 and uttering the voice corresponding thereto. In this way, by registering the acoustic feature of the user voice in units of characters, it is possible to increase the recognition rate of characters in units of individual characters in the future.

As another embodiment, since the voice recognition model DB1, the confusion matrix DB2, the acoustic feature model DB3, and the usage history DB DB4 require large-scale data and high-performance hardware/software to increase the voice recognition success rate, the voice recognition model DB1, the confusion matrix DB2, the acoustic feature model DB3, and the usage history DB DB4 may be excluded from the electronic device 1 and provided in the server 3.

The electronic device 1 may be installed with a voice recognition assistant to perform the voice recognition and correction. The electronic device 1 may be installed with one assistant or a plurality of assistants. If the plurality of assistants are installed in the electronic device 1, the voice recognition and correction method according to the embodiment of the disclosure may be applied to all of the assistants or only to a specific assistant.

As another embodiment, the subject using the recognized result may be the server 3 or the third-party device other than the electronic device 1.

The modules for the voice recognition and correction according to the embodiment of the disclosure may be implemented as a computer program product stored in a memory as a computer-readable storage medium or a computer program product transmitted/received through network communication. In addition, the above-described user identification modules may be implemented as a computer program alone or integrated. As described above, the computer program product or the computer program may include instructions executed by a processor.

The computer program according to the embodiment of the disclosure performs an operation of acquiring a recognition character obtained by converting a character section of a user voice received through the voice receiver, acquiring the plurality of candidate characters determined based on the confusion possibility with the acquired recognition character, and recognizing a candidate character having high similarity of the acoustic feature with the character section among the plurality of acquired candidate characters.

As described above, the electronic device according to the disclosure extracts a plurality of candidate characters that may be confusing with the confusion matrix stored and learned in advance for the recognition character, and improve the recognition performance of the voice in units of individual characters by performing correction (recognition) with the candidate character having the most similar acoustic feature among the plurality of candidate characters based on the acoustic feature model.

In addition, when inputting the login, the user registration, and the URL, the electronic device according to the disclosure may use the recognition result history that alphabets, numbers, symbols, and the like are input as a voice, recognized, and corrected to gradually update the confusion matrix and the acoustic feature model to be user-friendly, thereby improving the recognition performance of the user utterance voice.

Although the preferred embodiments of the disclosure have been illustrated and described above, the disclosure is not limited to the specific embodiments described above, and can be variously modified by those skilled in the art to which the disclosure pertains without departing from the gist of the disclosure claimed in the claims, and these modifications should not be understood individually from the technical ideas or prospects of the disclosure.

What is claimed is:

1. An electronic device, comprising:
a voice receiver; and
a processor configured to:
obtain a recognition character converted from a character section of a user voice input received through the voice receiver,
identify confusion probabilities of a plurality of candidate characters in association with the obtained recognition character, and similarities of the plurality of candidate characters for an acoustic feature of the character section, and
based on reflecting information about a weight assigned according to utterance type indicating whether the user voice input is continuously or discontinuously uttered to the identified confusion probabilities and the identified similarities, identify one of the plurality of candidate characters as an utterance character of the character section.

2. The electronic device of claim 1, wherein the processor is configured to:
convert the user voice input received through the voice receiver into a character string, and
divide the character string into each character.

3. The electronic device of claim 2, wherein the processor is configured to analyze whether a pause section exists between characters of the character string.

4. The electronic device of claim 3, wherein the processor is configured to assign a lower weight to a confusion probability of the recognition character in which the pause section exists than when no pause section exists.

5. The electronic device of claim 1, further comprising:
a memory,
wherein the processor is configured to store history information associated with an identification result of the candidate character in the memory.

6. The electronic device of claim 5, wherein the processor is configured to identify the confusion probabilities of the plurality of candidate characters based on a confusion matrix.

7. The electronic device of claim 6, wherein the processor is configured to update the confusion matrix based on the history information associated with the identification result of the candidate character.

8. The electronic device of claim 1, wherein the processor is configured to identify the similarities of the plurality of candidate characters for the acoustic feature of the character section based on acoustic feature models of a plurality of pre-stored candidate characters.

9. The electronic device of claim 8, wherein the processor is configured to update an acoustic feature model among the acoustic feature models based on history information associated with identification result of the candidate character.

10. The electronic device of claim 1, wherein the processor is configured to obtain correction probabilities by applying the confusion probabilities which are identified based on a confusion matrix for the plurality of candidate characters and the similarities for the acoustic feature of the character section which are identified based on acoustic feature models for a plurality of pre-stored candidate characters.

11. A method for controlling an electronic device, comprising:
obtaining a recognition character converted from a character section of a user voice input received through a voice receiver;
identifying confusion probabilities of a plurality of candidate characters in association with the obtained recognition character, and similarities of the plurality of candidate characters for an acoustic feature of the character section; and
based on reflecting information about a weight assigned according to utterance type indicating whether the user voice input is continuously or discontinuously uttered to the identified confusion probabilities and the identified similarities, identifying one of the plurality of candidate as an utterance character of the character section.

12. The method of claim 11, further comprising:
converting the user voice input received through the voice receiver into a character string; and
dividing the character string into each character.

13. The method of claim 12, further comprising:
analyzing whether a pause section exists between the characters of the character string; and
assigning a lower weight to a confusion probability of a recognition character in which there exists the pause section than when no pause section exists.

14. The method of claim 11, further comprising:
storing history information associated with an identification result of the candidate character.

15. The method of claim 14, further comprising:
identifying the confusion probabilities based on a confusion matrix for the plurality of candidate characters.

16. The method of claim 15, further comprising:
updating history information associated with the identification result of the candidate character.

17. The method of claim 11, further comprising:
identifying the similarities of the plurality of candidate characters for the acoustic feature of the character section based on acoustic feature models of a plurality of pre-stored candidate characters.

18. The method of claim 11, further comprising:
obtaining correction probabilities by applying the confusion probabilities which are identified based on a confusion matrix for the plurality of candidate characters and the similarities for the acoustic feature of the character section which are identified based on acoustic feature models for a plurality of pre-stored candidate characters.

19. A non-transitory computer-readable storage medium in which a computer program executable by a computer is stored, wherein the computer is configured to execute an operation of:

obtaining a recognition character converted from a character section of a user voice input received through a voice receiver, identifying confusion probabilities of a plurality of candidate characters in association with the obtained recognition character, and similarities of the plurality of candidate characters for an acoustic feature of the character section, and based on reflecting information a weight assigned according to utterance type indicating whether the user voice input is continuously or discontinuously uttered the identified confusion probabilities and the identified similarities, identifying one of the plurality of candidate as an utterance character of the character section.

20. The non-transitory computer-readable storage medium of claim 19, wherein the computer executes an operation of:

converting the user voice input received through the voice receiver into a character string; and dividing the character string into each character.

* * * * *

UNITED STATES PATENT AND TRADEMARK OFFICE
CERTIFICATE OF CORRECTION

PATENT NO. : 11,735,167 B2  
APPLICATION NO. : 17/103379  
DATED : August 22, 2023  
INVENTOR(S) : Jihun Park et al.

Page 1 of 1

It is certified that error appears in the above-identified patent and that said Letters Patent is hereby corrected as shown below:

In the Claims

Column 18, Line 27:  
In Claim 9, delete "with" and insert --with an--.

Signed and Sealed this  
Seventh Day of November, 2023

Katherine Kelly Vidal  
*Director of the United States Patent and Trademark Office*